PETRUS VAN SANTEN KOLFF.
MEANS FOR DETECTING CHANGES OF RESISTANCE IN ELECTRIC CIRCUITS.
APPLICATION FILED DEC. 9, 1916.
1,397,641.
Patented Nov. 22, 1921.
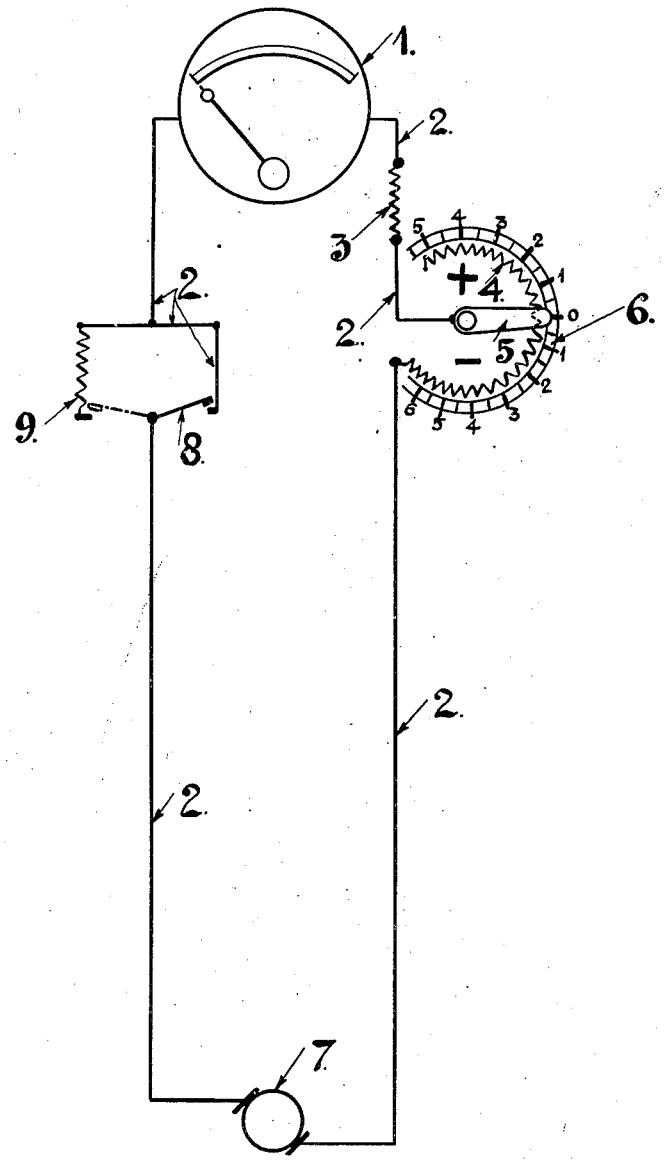

UNITED STATES PATENT OFFICE.

PETRUS VAN SANTEN KOLFF, OF PHILADELPHIA, PENNSYLVANIA.

MEANS FOR DETECTING CHANGES OF RESISTANCE IN ELECTRIC CIRCUITS.

1,397,641.     Specification of Letters Patent.     Patented Nov. 22, 1921.

Application filed December 9, 1916. Serial No. 136,060.

*To all whom it may concern:*

Be it known that I, PETRUS VAN SANTEN KOLFF, a citizen of the United States, residing in the city of Philadelphia, county of Philadelphia, State of Pennsylvania, have invented certain new and useful Improvements in Means for Detecting Changes of Resistance in Electric Circuits, of which the following is a specification.

In the use of various electrical indicating instruments which have been calibrated to give a certain scale reading dependent upon a function or functions transmitted by a circuit to which the instrument is connected, it sometimes happens that the circuit changes its resistance, due to various causes, independently of the function to which the istrument is responsive.

As a particular instance may be noted the case where a voltmeter, for instance, is used to give a speed reading on board ship. The use of a voltmeter provided with a scale graduated in revolutions per minute instead of volts is, of course, well known. It has been found, however, when the measuring instrument is located some distance from the shaft whose speed is to be indicated, that the instrument is affected not only by changes in speed but also by variations in resistance of the circuit connecting the measuring instrument with the generator driven by the shaft whose speed is being measured.

It is the purpose and object of this invention to provide a method of and an arrangement for quickly determining the changes in resistance which have taken place in a circuit whose function depends upon a definite constant resistance, in order that the circuit resistance, as a whole, may be brought back to the standard or normal amount, so that the reading of the instrument will again serve as a true indication of conditions in the circuit.

It is the principal object of my invention to provide means whereby this important and desirable result may be accomplished.

Other objects and advantages of my invention will be referred to in the detailed description thereof which follows or will be apparent from such description.

In the accompanying drawing I have shown diagrammatically a device embodying my invention.

In said drawing 1 designates an electrical indicator which is connected by means of wires 2, a calibrating resistance 3, an adjustable sliding resistance 4 and a switch 8 to any source of electrical energy, as 7.

The switch 8 is of the single pole, double throw type, and so placed and arranged that an additional resistance 9 may be included in or excluded from the circuit. It will be understood that the electrical circuit may be arranged in any other way or made up of other parts than those mentioned and described herein, inasmuch as my invention is not limited to any particular form or construction of circuit.

Let it be assumed that the indicator 1 is correctly adjusted to indicate some function, such as voltage, current, speed, temperature, etc. In order to obtain this correct adjustment the resistance of the circuit must be calibrated by means of the usual calibrating resistance 3. At the same time, the sliding handle 5 of the resistance 4 will be assumed to have been positioned centrally as shown in the drawing so that one-half of the resistance 4 is included in the calibrated electrical circuit; also the switch 8 is positioned so as to exclude the resistance 9 from the circuit.

The calibrated resistance of the total circuit is therefore composed of the sum of the individual resistances of the parts of the circuit, 1, 2, 3, 7, 8, and one-half of the resistance 4. Let this total calibrated resistance be called $R$.

We now adjust the resistance 9 so that it is equal to $mR$, $m$ denoting a predetermined factor.

If now at any time a reading be taken on the indicator 1 with resistance 9, *i. e.* ($mR$) excluded and immediately afterward a reading be taken with resistance 9, *i. e.* ($mR$) included in the circuit, then if the circuit be correctly calibrated these readings respectively must be in the ratio of $(m+1)R:R$ or as $(m+1):1$. In other words the readings will be in inverse proportion to the resistances of the circuit. It is assumed that the electrical energy from the source 7 remains constant during the brief period of check reading, but if there be any doubt as to its constancy the check readings may be repeated several times.

It will be readily seen that as long as the observed readings as described above are in the ratio of $(m+1):1$ there is positive proof that no appreciable change in the resistance of the circuit has taken place.

If on the other hand, two check readings give a different ratio than the one just mentioned, this would be positive proof that the circuit resistance had been subject to alteration.

Now let it be assumed that the circuit resistance R had been increased or decreased by an amount $x$. It would then be equal to R plus or minus $x$, i. e. $(R \pm x)$. Similarly by including resistance 9, i. e. $(mR)$ in the circuit, the resistance for the second check reading would be $(m+1)R \pm x$. The check readings corresponding to these resistances would no longer be in the previously established ratio of $(m+1):1$, but they would be inversely proportionate to the changed resistances.

It is evident that by restoring the original resistance of the circuit the calibration would also be corrected.

I shall now describe the means for ascertaining the value of an incurred resistance error and also the means for correcting this error:

Let a reading be taken on indicator 1 as above mentioned with resistance 9 excluded and let this reading be called A.

Immediately afterward let a reading be taken with resistance 9 included and let this reading be called B.

Let the error to be determined be called $x$. We now have this relation:

$$A:B = (m+1)R+x : R+x$$

or $$AR + Ax = (m+1)BR + Bx$$

or $$Ax - Bx = (m+1)BR - AR$$

or $$x = \frac{(m+1)B - A}{A - B} \times R$$

As $m$, B and A are known quantities the arithmetical relation between $x$ and R can now be determined in terms of percentage of R.

It should be stated that the adjustable resistance 4 is provided with a scale 6 graduated in percentages of resistance R; the point indicating zero being placed centrally on the resistance scale and percentage graduations being given in both directions and marked plus (+) and minus (−).

After determining the percentage error $x$ in the resistance of the circuit; it is now only necessary to adjust the handle 5 backward or forward as has been found to be necessary and the correct resistance of the circuit (as originally calibrated) will be restored.

To further illustrate the simplicity of application of this invention, let it be assumed that resistance 9, i. e. $(mR)$ be made equal to R, ($m$ being equal to unity). Then after taking two check readings, one with resistance 9 excluded and the other reading with resistance 9 included and calling these resistances again A and B respectively, we have the following identity:

$$A:B = 2R+x : R+x$$

$$AR + Ax = 2BR + Bx$$

$$x = \frac{2B - A}{A - B} \times R$$

The value of my invention may be illustrated by the fact that certain electrical instruments, especially those of low resistance need frequent adjustments in order to keep their indication correct. This adjustment naturally involves losses of time and money to either manufacturer or consumer or both. By the employment of my apparatus embodying my invention these adjustments can be readily and accurately performed at the site of installation by the user of the indicator in accordance with written instructions issued by the manufacturer of the instrument.

The invention has particular advantages when used in conjunction with pyrometers for indicating high temperatures of products requiring the application of high heat in their manufacture inasmuch as a slight error in temperature indication may seriously affect the quality of the product being manufactured. It is also of great advantage in conjunction with electric speed indicators or tachometers. In this case the source of energy is usually an electro-magnetic generator having a constant magnetic field and driven from the shaft the speed of which it is intended to measure. It occurs very often that such shafts are in inaccessible places, or their construction and mounting may not admit of check readings being taken by other means, such as stop watch and counter. As an instance, I may mention the large propeller shafts on vessels.

Inasmuch as my invention is self-contained and does not involve the use of separate apparatus, it will be of great value in cases such as just described. Moreover, it should be noted that the checking up operation will occupy extremely little time so that there is little chance for the occurrence of errors due to current fluctuations as is the case when a stop watch and counter are used. In the latter case it is customary to take readings for a period of one minute during which period severe speed fluctuations may seriously affect the accuracy of the comparative readings.

I claim:—

1. The mode of testing a circuit containing an indicating instrument the correctness of the indications of which depend on the constancy of the resistance of the circuit as initially determined upon, which consists in temporarily introducing into the circuit a resistance element whose value has a known relation to the resistance of the circuit as so initially determined upon and observing the readings of the instrument taken in short succession with the said resistance element in the circuit and out of the circuit respectively.

2. An electric circuit containing an indicating instrument, the correctness of the indications of which depend on the constancy of the initial resistance of the circuit, an electric resistance element whose value has a known relation to said initial resistance of the circuit and means for switching, at will, said resistance element in and out of the circuit.

3. An electric circuit containing an indicating instrument, the correctness of the indications of which depend on the constancy of the initial resistance of the circuit, an electric resistance element whose value has a known relation to said initial resistance of the circuit, means for switching, at will, said resistance element in and out of the circuit and means in the circuit for varying at will the resistance thereof.

4. An arrangement according to claim 2 in which the ratio of the insertible resistance to the resistance of the circuit is a whole number.

5. In a circuit including an electromagnetic generator having a substantially constant field, the combination of an indicating device, a resistance member whose resistance bears a definite ratio to the resistance of the circuit, said member being normally excluded from the circuit and means for including the said resistance in the circuit.

6. In a circuit including an electromagnetic generator having a substantially constant field, the combination of an indicating device, a resistance member whose resistance bears a definite ratio to the resistance of the circuit, said member being normally excluded from the circuit, means for including the said resistance in the circuit and separate means for increasing and decreasing the resistance of the circuit.

7. An electrical measuring system comprising a measuring instrument calibrated to indicate changes in a function under measurement, a source of electrical energy affected by the change in function measured, and a circuit connected to said source and said measuring instrument provided with a variable resistance in series and a standard resistance, in combination with means for including said standard resistance in the circuit and for excluding it therefrom, whereby any changes from a standard value of the circuit constant may be determined and compensated for.

In testimony that I claim the foregoing as my invention I have hereunto signed my name this 7th day of December, A. D., 1916.

PETRUS van SANTEN KOLFF.